C. FOWLER.
POTATO PICKER OR GATHERER.
APPLICATION FILED MAR. 29, 1919.

1,351,948.

Patented Sept. 7, 1920.
2 SHEETS—SHEET 1.

Witnesses:
Marian E. Eisenstein

Inventor
Charles Fowler
By
Atty

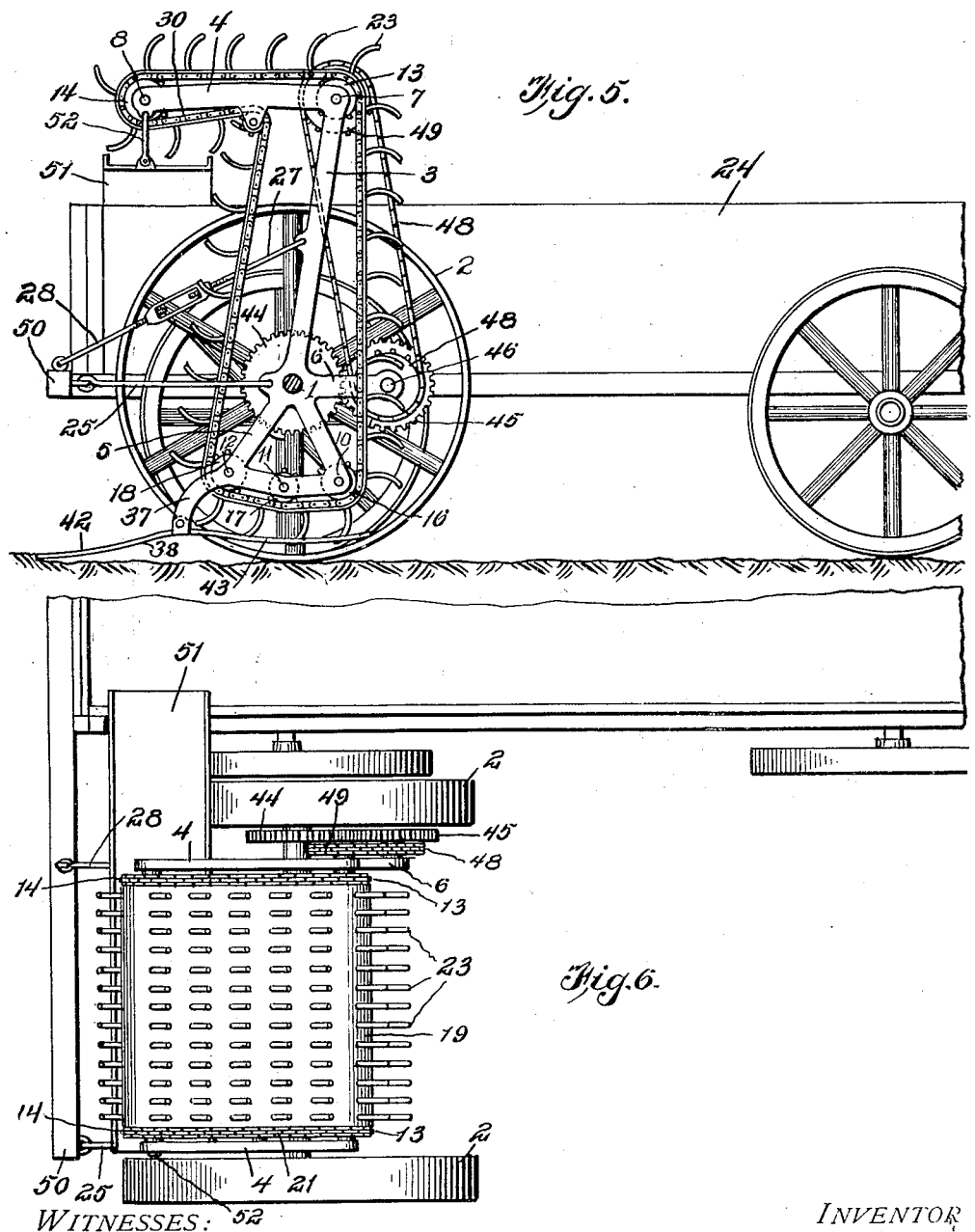

UNITED STATES PATENT OFFICE.

CHARLES FOWLER, OF TOMKINS COVE, NEW YORK.

POTATO PICKER OR GATHERER.

1,351,948.  Specification of Letters Patent.  Patented Sept. 7, 1920.

Application filed March 29, 1919. Serial No. 286,062.

*To all whom it may concern:*

Be it known that I, CHARLES FOWLER, a citizen of the United States, residing at Tomkins Cove, in the county of Rockland and State of New York, have invented new and useful Improvements in Potato Pickers or Gatherers, of which the following is a specification.

This invention relates to a device for picking or gathering potatoes or other vegetables or fruits from the surface of the ground, the object of the invention being to provide a device which will rapidly and efficiently gather and elevate the potatoes or other vegetables or fruits and deposit the same into a suitable receptacle.

Another object of the invention is to provide a gatherer which may be applied to an ordinary farm wagon or like traveling vehicle and detached therefrom when its use is not required.

Still another object of the invention is to provide a simple and inexpensive construction of gatherer which will gather and deposit the articles in such manner as to reduce or obviate liability of injury thereto.

The invention consists of the features of construction, combination and arrangement of parts hereinafter fully described and claimed, reference being had to the accompanying drawing, in which:—

Fig. 5 is a side elevation showing a different arrangement of the gatherer.

Fig. 6 is a top plan view of the same.

Figure 1:
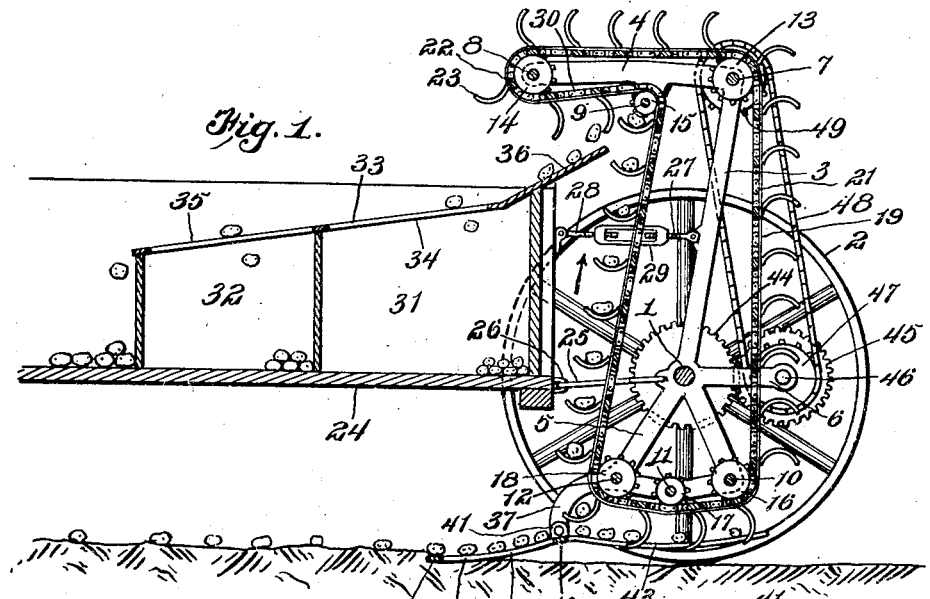
Figure 1 is a vertical longitudinal section through the gatherer and a portion of a vehicle to which it is applied.
Figure 2:
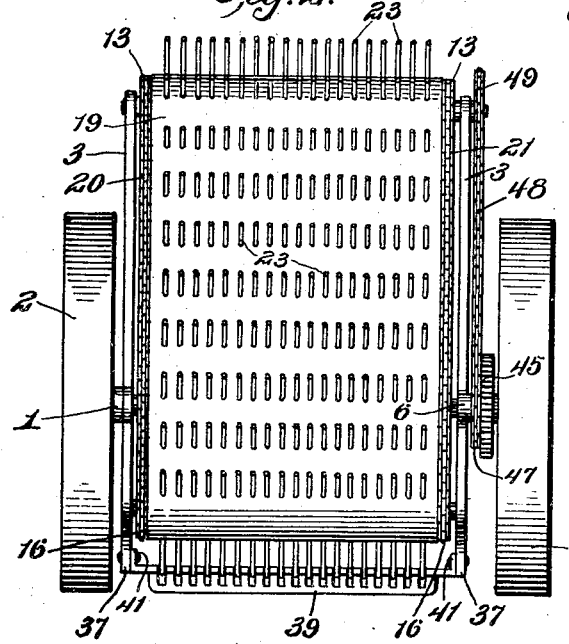
Fig. 2 is a rear elevation of the same.
Figure 3:
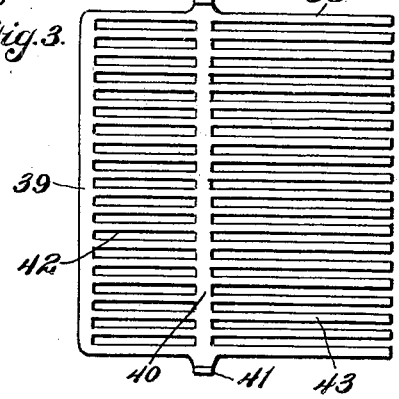
Fig. 3 is a plan view of the gathering scoop.
Figure 4:
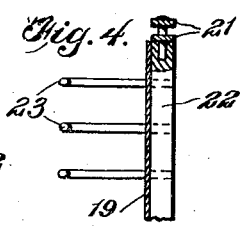
Fig. 4 is a detail section through the gathering belt.

In carrying my invention into practice, I provide a gatherer or picker comprising a horizontal transverse supporting shaft 1, upon which are mounted supporting wheels 2, which wheels may be mounted upon the shaft in any suitable manner. Supported by the shaft 1 is a carrier frame, composed of two side frame pieces each consisting of a main vertical arm or upright 3 having at its upper end a forward horizontal projecting arm 4 and at its lower end a substantially triangular bracket member 5. One of the side frame pieces is further provided with a rearwardly projecting horizontal arm 6, arranged substantially in horizontal alinement with the shaft 1, for a purpose hereinafter described.

Extending between and connecting like portions of the two side frame members are rods or shafts 7, 8, 9, 10, 11 and 12, which connect said side frame members to form a unitary frame structure, and journaled upon the shafts at opposite sides of the frame are duplicate sets of guide sprockets 13, 14, 15, 16, 17 and 18, the sprockets 13 and 14 being arranged at opposite ends of the arms 4, and the sprockets 15 about midway of the length of said arms below the level of said sprockets 13 and 14, while the sprockets 16, 17 and 18 are arranged upon the horizontal base portions of the triangular brackets 5 with the axes of the sprockets 16 and 18 substantially in horizontal alinement or at the same level and the axis of the smaller sprocket 17 at such a point as to dispose the lower portion of the periphery of said sprockets a short distance below the level of the lower portions of the peripheries of the sprockets 16 and 18. Mounted upon and arranged to travel around the aforesaid sprocket wheels is an endless gathering belt 19 composed of a pair of side chains 20 and 21 connected at spaced intervals by cross bars 22, the two chains being thus adapted to move at the same rate of speed in unison. The bars 22 are provided with rows of gathering fingers 23, the fingers of each row being arranged in spaced relationship transversely of the belt and said fingers being longitudinally curved from their butts or inner ends toward their tips or free ends, thus forming in conjunction curved pockets to receive and hold the potatoes or other vegetables or fruits gathered from the ground and to convey them from the ground without displacement to an elevated point for discharge.

The frame structure is pivotally mounted upon the axle 1 so that the belt 19 may be adjusted or properly disposed with relation to the rear end of a wagon body or bed 24 in connection with which the gatherer is to be used, it being understood that the device is designed to be employed as an attachment for a farm wagon or other like vehicle, whereby when the vehicle is drawn or propelled across a field the gatherer will operate in rear thereof to pick or gather the potatoes or other vegetables or fruits and deposit the same into the wagon body. For the purpose of securing the frame to the wagon body the frame members are provided about in line with the axle 1 with hooks or other fastening and draft connections 25 to engage suitable eyes or keepers 26 on the wagon body, while the arms 3 are provided at points above the shaft with threaded rods 27 adapted to be coupled with similar rods 28 on the wagon body by turnbuckles 29, whereby the supporting frame of the gatherer may be fixed to the vehicle body against any but a slight tilting movement, while at the same time it may be adjusted in a forward or rearward direction to properly dispose the delivery portion of the belt with relation to the receiving portion of the wagon body for the purpose of insuring the discharge of the potatoes or other articles into the receptacle in a reliable manner and with a minimum degree of drop or fall, whereby liability of bruising or otherwise injuring the potatoes or articles will be reduced or entirely avoided.

It will be observed that the lower portion of the belt extends around the sprockets 16, 17 and 18 in such a manner as to form a broad bight or loop at the base of the belt, and that the belt thence extends forwardly in the form of front and rear ascending and descending stretches, while the upper portion of the belt extends in the form of an elongated horizontal loop over the sprockets 13, 14 and 15, providing a portion of the belt which juts or projects forwardly beyond the line of the forward stretch of the belt so as to overhang the rear end of the wagon body, the front ascending or delivery section of the belt thus being provided with a horizontal delivery portion 30 arranged in advance thereof for a depositing action as described.

In practice the wagon body 21 may be provided with any suitable means for receiving the potatoes or other articles to be delivered, but in the present instance it is shown as divided into compartments 31, 32, etc., over which is arranged an inclined plane or runway 33 having slots 34, 35, etc., therein communicating with the respective compartments, the said runway being further provided at its higher or receiving end with an inclined upwardly and rearwardly projecting ledge or shelf 36. By this construction and arrangement of the ledge or shelf 36, it will be seen that such ledge or shelf projects beyond the rear end of the wagon and is arranged so as to come immediately below the delivery portion 30 of the gathering belt, thus disposing the shelf so that the potatoes or other articles delivered from the discharging fingers of the belt pass therefrom to the shelf in an easy and convenient manner and with a very small drop off or fall so that injury thereto will be prevented. The slots in the runway 33 communicating with the respective compartments may be of such size as to effect the gradual separation of the potatoes into different grades or sizes which will be deposited in the respective compartments, thus sorting out the potatoes at the time of delivery.

Carried by the hanger bars 37 at the lower end of the frame is a gathering scoop or shovel 38. This scoop or shovel is in the form of a grate, having spaced longitudinal tines connected at their forward end by a cross bar 39 and at an intermediate point by a cross bar 40, the latter being provided with lugs 41 fastened to the hangers 37. The forward portion of the scoop, namely that portion lying in advance of the bar 40, is downwardly and forwardly inclined or curved and forms a gathering portion 42, while the rear portion of the shovel, namely the portion in rear of the bar 40 forms a receiving platform 43, which is concavo-convexly curved. In the forward travel of the gatherer the bar 39 penetrates the ground to a sufficient extent to gather up the potatoes or other articles which travel up the inclined gathering portion 42 of the scoop and thence pass to the platform portion 43 in the concave surface of which they seat, whereby they are retained from displacement while the gathering fingers 23 of the lower gathering portion of the endless gathering belt enter between the tines of the platform and scoop up the potatoes therefrom, as clearly illustrated in Fig. 1. The scoop or shovel is preferably made of spring metal or other resilient material, and as the gatherer travels forward this is vibrated sufficiently to cause the soil adhering to the potatoes to work loose and drop downwardly through the spaces between the tines. It will be obvious from the foregoing description that the potatoes taken up by the fingers 23 will be carried by the ascending stretch of the belt upwardly and discharged from the delivery portion 30 of the belt on to the ledge 36, from which they will pass into the desired receiver or receivers within the wagon body. It is to be understood that any rocks or other foreign particles which may be taken up by the fingers may be removed by an attendant before such foreign substances pass from the ascending to the delivery portion of the belt.

The belt is driven in practice from a drive gear 44 fixed to the hub of one of the wheels or suitably mounted on the shaft 1, with which gear 44 meshes a gear 45 on a shaft 46 carried by the frame arm 6. On the shaft 46 is a sprocket wheel 47 connected by a chain 48 with a sprocket wheel 49 on the shaft 7, through which said shaft 7 is driven to communicate motion to the belt. It will, of course, be understood that in practice one or both wheels may have a clutch connection with the axle 1 for transmitting driving motion to the axle to be communicated to the belt and also to permit short turning motion of the gatherer, in the manner similar to the wheel mounting of different types of agricultural implements.

In Figs. 5 and 6 I have shown an arrangement wherein the gatherer is disposed at one side of the wagon body 24 and is coupled by its fastening connections to a draft bar 50 extending suitably beyond such side of the vehicle. With this arrangement it is obvious that the gatherer may work along one side of the vehicle, allowing the latter to be drawn at a point outside the row or rows from which the vegetables or fruits are being gathered, without liability of the vegetables or fruits being crushed or otherwise injured by the draft animals or wheels of the vehicle. This construction also permits the gatherer to be operated around and between trees and close to fences or other obstructions for a gathering operation while the vehicle is running in a line clear of the vegetables or fruits. It will be observed that the construction of the gatherer is the same as that before described, but that the delivery portion thereof is disposed to deposit the fruit or vegetables into an inclined chute 51, suitably fastened to the frame thereof, as indicated at 52, whereby the gathered fruit or vegetables will roll by gravity into the vehicle or into any suitable receptacle carried thereby or arranged therein.

From the foregoing description, it will be seen that my invention provides a gatherer or picker which is simple of construction and may be manufactured and sold at a comparatively low cost, which may be applied at the side or rear of a farm wagon for the purposes described or driven by any type of traction means, and which in use will be reliable and efficient in action and enable a large quantity of potatoes or other articles to be gathered within a given working time.

Having thus fully described my invention, I claim:—

1. In a device of the character described, the combination with a vehicle body, of a wheeled support arranged exteriorly of and in proximity to said vehicle body, gathering means mounted on the support for picking up articles from the ground, and an endless belt arranged to take up and elevate the articles gathered by the gathering means, said belt being provided with a looped horizontal portion connecting its ascending and descending stretches, said portion jutting outwardly beyond the ascending stretch so as to partially overhang the vehicle body.

2. In a device of the character described, the combination with a vehicle body, of a gathering device arranged in proximity to said vehicle body, said gathering device comprising an axle having supporting wheels, a frame pivotally mounted on said axle, means for adjustably securing said frame to the vehicle body and holding it when secured against tilting motion, gathering fingers carried by the frame to take up articles from the ground, an endless belt carried by the frame to take up and convey said articles from the gathering fingers to the vehicle body, said belt being provided with a looped horizontal portion connecting the upper ends of its ascending and descending stretches and projecting outwardly beyond the plane of the ascending stretch so as to partially overhang the vehicle body, and means for driving said belt.

3. A device of the character described comprising an axle provided with supporting wheels, a frame mounted on said axle, gathering means at the lower end of the frame for picking up articles from the ground, an endless belt upon the frame provided with fingers to pick up and elevate the articles from the gathering means, said belt being provided with a delivery portion projecting horizontally beyond the vertical plane of the elevating portion of the belt, and means for transmitting driving motion to the belt.

4. A device of the character described comprising an axle, supporting wheels upon the axle, a frame carried by the axle, a grated gathering shovel supported by the frame and having a forward gathering portion sloping upwardly and rearwardly and a rear receiving portion longitudinally concaved, said portions being formed of spaced elements, a gathering belt mounted upon the frame and provided with gathering fingers to pass between the spaced elements of the platform and pick up and elevate the articles therefrom, said belt being provided at its upper end with a horizontal delivery portion projecting beyond the vertical line of the delivery portion thereof, and means driven by the running gearing of the device for driving the belt.

5. A device of the character described comprising an axle, supporting wheels on the axle, a frame tiltably mounted on the axle, fastening devices arranged at different elevations for adjustably securing the frame to a traction member and holding the frame when secured against tilting motion, a grated gathering shovel at the lower end of the frame, an endless belt supported by the frame and provided with gathering fingers, said belt having an upper portion extending horizontally beyond the vertical plane of the ascending stretch of the belt, and means operative in the movement of the device for imparting motion to the belt.

In testimony whereof I affix my signature.

CHARLES FOWLER.